May 5, 1964
E. L. HAULK
3,131,504
FISHING LURE
Filed Sept. 17, 1963
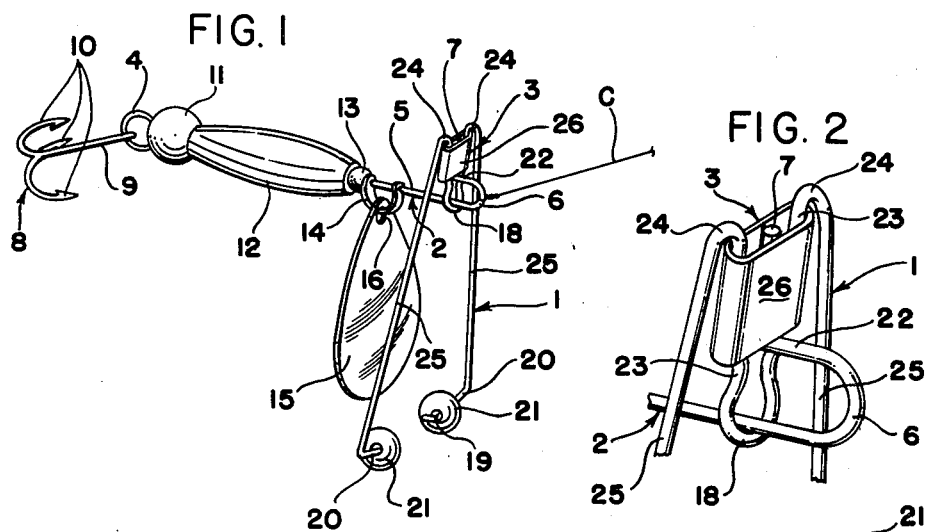
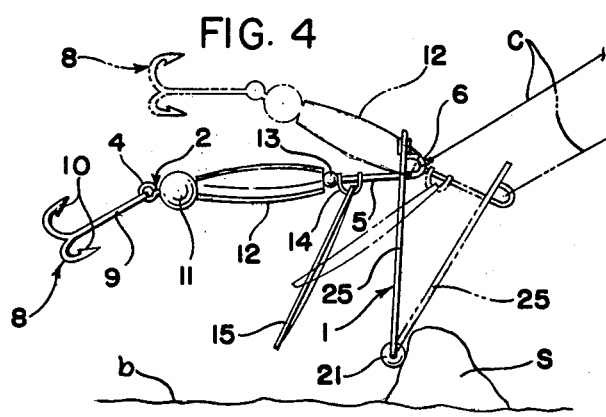
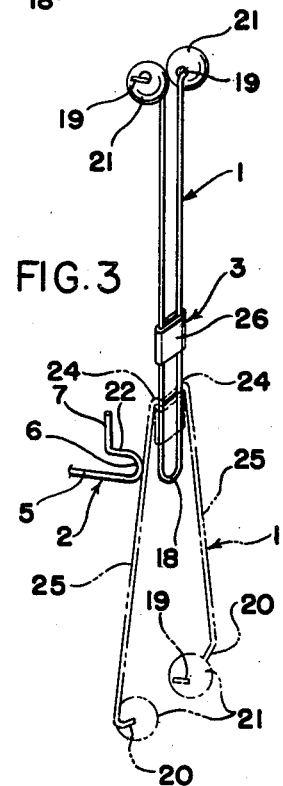
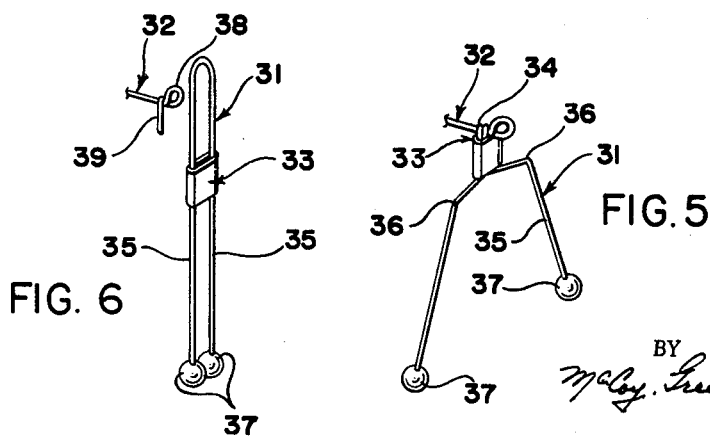
INVENTOR.
ELVRO L. HAULK
BY
ATTORNEYS United States Patent Office 3,131,504
Patented May 5, 1964

3,131,504
FISHING LURE
Elvro L. Haulk, 339 Michigan Ave., Mansfield, Ohio
Filed Sept. 17, 1963, Ser. No. 309,475
8 Claims. (Cl. 43—42.16)

The present invention relates to fishing lure and more particularly to a lure which may be made of wire at very low cost and which is designed to prevent the hook from snagging on obstructions as it is being drawn through the water.

Heretofore, effective fishing lures have been costly because of the large amount of hand labor required to make the lures attractive to fish. Furthermore it has been particularly difficult to provide a lure which could be drawn along on the bottom of a lake or stream because of the possibility of snagging or fouling of the lure on rocks and vegetation. Although attempts have been made to provide structures which would avoid fouling, such resulting structures have not been highly successful as they had reduced ability to attract the fish.

The present invention solves the aforementioned problems by providing a highly attractive lure which is well protected against fouling or snagging upon rocks, weeds, driftwood, logs and other obstructions and which, in spite of its effectiveness, can be manufactured at nominal cost. The lure is formed by simply bending wire members to provide a body with long diverging legs which provide rotatable supports for weights, serving as wheels for the lure, the legs are so arranged as to lift the body of the lure and the trailing hook to prevent fouling of the lure as it is drawn through the water. The lure has a narrow elongated body, to which a spinner may be rotatably attached, mounted on a single wire which connects to the hook.

Assembly of the two wire members of the lure is extremely simple and may be performed in a minimum period of time by sliding a metal band over the member forming the depending legs when the legs are moved together to form a single bend or loop, inserting the end portion of the wire member comprising the body portion of the lure into the loop formed by the two legs, pulling the metal band over the end of said body wire at the bend of said loop, and crimping or squeezing the band to form a rigid connection between the two members. This method of assembly makes possible the manufacture of a lure at a fraction of the cost of previously known lures and also provides the rigid connection necessary so that the lure will react in the desired manner when the legs strike an obstruction.

It is among the objects of the present invention to provide an inexpensive fishing lure which attracts fish in an effective manner when being drawn along the bottom of a body of water.

A further object of the invention is to provide a weighted fishing lure whereby weight of bait proper may be increased or decreased to suit water depth and equipment variances, which may be dragged along the bottom with a minimum pulling force and which will avoid fouling on rocks or other obstructions.

A further object of the invention is to provide a new and improved fishing lure which may be manufactured at a minimum cost, which may be easily and readily assembled and that is simple in construction and efficient in use.

These and other objects, uses and advantages of the invention will become apparent to those skilled in the art from the following detailed description taken in conjunction with the accompanying drawings, wherein like reference characters denote corresponding parts throughout the several views, and in which:

FIGURE 1 is a perspective view of a fishing lure constructed in accordance with this invention, showing the relative position of the parts when the lure is being pulled along the bottom of a body of water;

FIGURE 2 is a fragmentary perspective view similar to FIGURE 1 but on a larger scale showing the connection between the body wire of the lure and the wire forming the legs;

FIGURE 3 is a fragmentary perspective view showing the method of assembling the lure of FIGURE 1, the wire forming the legs being shown in solid lines in its position prior to attachment to the body wire and being shown in dot-dash lines in its position after the crimping and bending operations;

FIGURE 4 is a side elevational view showing in solid lines the position of the lure as it strikes an obstruction and showing in dot-dash lines its position as it is pulled over the obstruction;

FIGURE 5 is a fragmentary perspective view similar to FIGURE 1 but showing a modified form of lure; and FIGURE 6 is a perspective view showing the shape of the body wire and the wire forming the legs of the lure of FIGURE 5 before the two wires are rigidly connected by the metal sleeve.

Referring more paticularly to the drawings, which are drawn to scale, in FIGURES 1 to 4 there is illustrated a preferred form of fishing lure constructed according to the present invention, including a leg wire 1 and a body wire 2 which are rigidly connected by a flattened metal band 3. The body wire 2 is bent to provide an eyelet 4 for receiving the eye of a hook 8, a long straight portion 5, a loop bend 6 on the forward end for receiving a cord or fishing line c, and an upwardly extending attaching portion 7 perpendicular to the portion 5.

The hook 8 of conventional design is connected to the eyelet 4 and has a shank 9 leading from the eyelet to the three barbs 10 formed at the ends of the three hook portions. A spherical, colored, plastic bead 11 with an axial hole of a size to receive the straight portion 5 is mounted on said portion together with an elongated annular body portion 12, which has an axial length several times its maximum diameter, and a small polished metal sphere or bead 13. The body portion 12 is shaped and painted to resemble the body of an insect and gradually decreases in diameter towards its opposite ends. Said body portion has an axial bore to receive the straight portion 5 and is rotatably mounted on said straight portion, the turning of the body portion on the portion 5 tending to attract the fish, particularly when the body portion is spotted or similarly painted.

A U-shaped strip 14 having holes therein to receive the body wire 2 is rotatably mounted on said wire to provide a support for a conventional polished metal spinner 15 of oval or tear-drop shape having a circular hole 16 for receiving the strip 14. Said spinner is stamped from a metal sheet of uniform thickness to provide a convex reflective surface facing forwardly away from the hook 8.

The leg wire 1 is preferably longer than the body wire 2 and prior to assembly of the fishing lure the leg wire 1 is provided with a central bend 18 and sharply bent end portions 19, the latter being formed after mounting two spherical weights 21 on the ends of the leg wire. Each weight has a cylindrical bore to receive the leg wire and a spherical external surface. As shown in FIGURES 1 and 3, the leg portions of the wire 1 are bent near the roller weights 21 to provide straight inclined portions 20 upon which said weights are rotatably mounted.

The weights 21 are mounted on the portions 20, and the central bend 18 is formed as shown in solid lines in FIGURE 3 before the metal sleeve 3 is applied. The wire is bent at the center and back on itself as indicated in FIGURE 3 so that the two parallel portions of the wire near the bend will fit inside the metal band 3 and permit sliding of the metal band over the leg wire 1, as shown, for example, in FIGURE 3, whereby a loop is formed between the bend 18 and the band 3. In order to assemble the parts, the front bend 6 of the body wire is inserted through said loop to a position wherein the vertical attaching portion 7 is between the parallel connecting portions 23 of the leg wire in alignment with the internal opening of the band 3. Then the band 3 is slid toward the bend 18 over the end portion 7 until it engages the straight portion 22 of the body wire which extends between the bend 6 and the end portion 7.

When the metal band 3 is in this position (see FIGURE 2) a connection is provided between the leg wire and the body wire, but this is a loose connection. In order to provide a rigid connection, the opposite faces 26 of the band 3 are squeezed or crimped to clamp the wires tightly therebetween and thereby form a rigid connection, the bend 18 having an internal radius sufficiently small to resist relative movement between the straight portion 5 and the connecting portions 23 so that pinching of the portions 23 together around the portion 5 is unnecessary.

After crimping of the metal band 3 the parallel legs of the wire 1 are parallel to the upright portion 7 of the body wire (see FIGURE 3). In order to complete forming of the wire, the band 3 is held stationary and the leg wire is bent over from the position shown in solid lines in FIGURE 3 to the position shown in dot-dash lines, thereby forming a bend 24 at the top of the connecting portion 23 and at the top of the band 3 and an inclined straight leg portion 25 having a length materially greater than that of the hook 8. This provides the wire 1 with a symmetrical shape and two diverging legs 25 located in a plane substantially normal to the straight portion 5 of the body wire as shown in the drawings.

The method of assembly described above reduces the time required for an ordinary person to connect the wires to a minimum and reduces the cost of the lure while at the same time providing an ideal rigid connection between the wires which is at least equal to and probably superior to any connection that could be made by welding or soldering operations. The rigid connection is necessary to permit the lure to function effectively as will be explained in more detail hereinafter.

The fishing lure of this invention is designed for maximum effectiveness in attracting fish when the weights 21 are engaging the bottom b of the body of water containing said fish, and particularly when the lure is at rest on the bottom. The legs 25 and the body portion 12 are constructed to resemble an insect, the portion 12 having a length which is about 4 to 10 times its average diameter and preferably greater than the length of the hook.

The leg portions 25 each have a length less than that of the body portion 5 and are arranged in a plane located at an acute angle to the horizontal when the lure is at rest on a flat horizontal surface with the weights 21 engaging said surface. Said acute angle is preferably 45 to 75 degrees, and the body portion 5 preferably has a length no greater than twice the length of each of the leg portions 25 so that it is inclined about 25 to 45 degrees relative to said flat horizontal surface.

Each of the leg portions 25 has a length greater than that of the hook 8 and greater than that of the spinner 15, and said length is preferably about 1.5 to about 3 times the length of the hook 8. Since the leg portions 25 are long and located in a plane nearly perpendicular to the body portion 5 (i.e., a plane inclined at an angle of 75° to 100° relative to the body portion 5), said leg portions lift the hook 8 further above the ground b when the fish line c is pulled as shown, for example, in FIGURE 4. The spherical weights 21 tend to prevent the wire from entering small cracks or depressions and facilitate movement over small stones while at the same time serving to stabilize the lure and keeps the lure from turning over and thus twisting the fishing line. If the weights 21 roll against a large obstruction such as a stone s, the pivoting of the legs 25 swings the body portion 12 upwardly to lift the hook 8 above the obstruction as shown in dot-dash lines in FIGURE 4, and thereby prevents snagging of the hook.

In order to provide maximum protection for the hook, the lure is constructed so that the hook has a length about 0.4 to 0.7 times the distance from the straight body portion 5 to a plane contacting the two roller weights 21 at the bottom of the two legs.

The spinner 15 is preferably relatively large and usually has a length about 0.6 to 0.9 times the length of the leg portions 25 and usually no greater than three times the maximum width of the body portion 12.

The legs 25 are arranged in diverging relation as shown in FIGURE 1 and may be moved together within the elastic limits of the wire material to pass between vertical crevices or between weeds without permanently deforming the wire. This greatly reduces the chances for snagging of the lure between rocks. The diverging legs also improve the stability of the lure and increase the distance between the centers of the spherical weights 21. The distance between such centers is preferably less than the length of each of the leg portions 25 and preferably greater than half of such length.

FIGURE 5 shows a modified form of fishing lure which is identical to the lure described above except for the construction of the leg wire and body wire, the spinner, body portion, hook and other elements carried by the body wire being omitted from the drawing. The modified form of body wire 32 is connected to the leg 31 by a metal band or sleeve 33 which is of the same size as the band 3 described above.

The method of assembly of the modified lure of FIGURE 5 is quite similar to the method described above and shown in FIGURE 3. The leg wire 31 is first provided with a central bend 34 and parallel leg portions 35 after the spherical roller weights 37 have been rotatably mounted on the wire. The band 33 is slid over the bend 34 to form a large loop as shown in FIGURE 6 and the eye 38 of the body wire 32 is moved through the loop to position the vertical end portion 39 between and parallel to the leg portions 35 and in alignment with the internal opening of the band 33. It will be noted that the portion 39 is generally perpendicular to the long straight portion of the body wire which receives the members 11 to 14 (not shown) and that the leg portions 35 are located in a plane generally perpendicular to the body wire. The band 33 is then slid toward the bend 34 over the end portion 39 of the body wire and is squeezed or crimped to form a rigid connection between the leg wire and the body wire. The leg portions 35 are then bent outwardly in opposite directions in the plane of the legs 35 to form the bends 36 and to provide the leg wire with a symmetrical shape as shown in FIGURE 5, the straight portion of the body wire 32 being located substantially in a plane midway between the spherical roller weights 37.

It will be noted that the arrangement of the wire at the metal band 33 is generally the reverse of the arrangement shown in FIGURE 2. Both arrangements permit a rigid connection between the leg wire and the body wire in a minimum period of time.

It will be understood that, in accordance with the provisions of the patent laws, variations and modifications of the specific devices disclosed herein may be made without departing from the spirit of the invention.

Having thus described my invention, I claim:

1. A fishing lure comprising a substantially straight body wire having an axially elongated body member mounted thereon to resemble an insect body, said body wire terminating in a line-receiving loop forwardly of said body member and an eye rearwardly of said body member, a hook pivotally connected to said body wire at said eye, a pair of diverging wire legs rigidly connected to said body wire adjacent said loop and extending downwardly from said body wire a distance less than the length of said body wire and materially greater than the distance from said eye to the bottom of said hook, and a weight rotatably mounted on the bottom portion of each leg.

2. A fishing lure comprising a body wire having a tubular body member rotatably mounted thereon to resemble an insect body, said body member having an axial length at least one-third the length of said body wire and a radial thickness greater than the diameter of said wire, means at the front of said body wire for attachment to a fishing line, means at the terminal end of said body wire for supporting a hook, a hook carried by said last-named means and having a single shank and a plurality of barbs, a leg wire with a length greater than that of said body wire having a central portion rigidly connected to said body wire near the front of said body wire, said leg wire being formed with two legs that extend downwardly from said body wire a distance materially less than the length of said body wire and materially greater than the distance from said body wire to the bottom of said hook, said legs extending transversely of said body wire and having rotatable ground-engaging weights which are spaced apart a distance more than half of said last-named distance.

3. A fishing lure as defined in claim 2 wherein said legs are located substantially in a plane that is inclined about 75 to 100 degrees relative to said body wire, the length of said body wire is 1 to 2 times the length of each leg, and the distance from said body wire to the end of said hook is about 0.4 to 0.7 times the length of each leg.

4. A fishing lure comprising a body wire of uniform cross section having a tubular body member mounted thereon to resemble an insect body, a leg wire with a uniform cross section and a length greater than that of said body wire bent to provide a pair of diverging downwardly extending legs, each having a length less than that of said body wire, said body wire having a hook-supporting eye at its rear end and a line-receiving bend at its front end, said body wire having an attaching portion adjacent said bend that projects transversely of said body wire, said leg wire having a central bend extending around said body wire rearwardly of said line-receiving bend and having two connecting portions at said bend located on opposite sides of said attaching portion, and a flattened metal band surrounding said connecting portions and said attaching portion and spaced from said central bend, said metal band providing a rigid connection between said leg wire and said body wire and holding said body wire against said central bend and between said connecting portions.

5. A fishing lure comprising a substantially straight body wire having means at its rear end for pivotally connecting said wire to a hook and means at its front end forming a string-receiving loop for connecting the lure to a fishing line, an axially elongated body mounted on the intermediate portion of said body wire, a singe leg wire having a length greater than that of said body wire, said leg wire having its central portion rigidly connected to said body wire at said loop and being formed to provide two legs located substantially in a plane that is inclined about 75 to 100 degrees relative to said body wire, each leg having a lower end with a weight mounted thereon and spaced from said body wire a distance less than the length of said body wire.

6. A fishing lure comprising a straight body wire with a line-receiving loop at its front end and a hook-receiving eye at its rear end, an axially elongated body member having a thickness several times that of said wire and mounted on said body wire to resemble an insect body, said body member having a length about one-third to two-thirds the length of said body wire, a pair of diverging wire legs rigidly connected to said body wire adjacent said loop and extending downwardly from said body wire a distance less than the length of said body wire and greater than half of said length, a sheet metal spinner rotatably mounted on said body wire between said body member and said loop and rearwardly of said legs, said spinner having a length less than that of said body wire and at least half the length of each leg, said spinner having a convex reflective surface facing forwardly toward said legs, and a spherical metal weight rotatably mounted on the lower end portion of each leg.

7. A fishing lure having a body wire with a hook-retaining eye at one end and a line-receiving bend at the opposite end, a leg wire having a length greater than that of said body wire and having a central bend with connecting portions adjacent said bend, a metal band extending around said connecting portions and spaced from said bend to define an opening between said bend and said metal band, said body wire extending through said opening, an attaching portion of said body wire adjacent said bend being disposed transversely of said body wire and extending into said metal band between said connecting portions, said metal band gripping said connecting portions and said attaching portion to form a rigid connection between said leg wire and said body wire, said leg wire having sharp bends adjacent said metal band and being provided with two ground-engaging leg portions transverse to said body wire and extending downwardly a substantial distance from said body wire, a hook having a shank attached to the eye of said body wire and having an overall length less than said last-named distance, a tubular body member rotatably mounted on said body wire and extending at least one-third the length of said body wire between said leg wire and said hook to resemble an insect body, a sheet metal spinner rotatably mounted on said body wire between said body member and said leg wire, and a roller weight rotatably mounted on the lower part of each leg portion.

8. A fishing lure comprising a body wire having a long straight body portion and an annular body rotatably mounted on said straight portion, said body having an axial length about 4 to 10 times its average diameter; a hook mounted on the rear of said body wire and means forming a line-receiving loop at the front of said body wire; a pair of diverging wire legs rigidly connected to said body wire adjacent said loop and located substantially in a plane transverse to said straight body portion, each leg having a length substantially greater than that of said hook and less than that of said body portion; and a roller weight mounted for rotation on the lower end of each leg; said body wire and said legs being arranged so that, when the lure is at rest on a flat horizontal surface, said legs extend forwardly, said plane containing said legs is inclined about 45 to 75 degrees relative to said horizontal surface, and said straight body portion is inclined about 25 to 45 degrees relative to said horizontal surface.

References Cited in the file of this patent

UNITED STATES PATENTS

| 354,721 | McHarg | Dec. 21, 1886 |
|---|---|---|
| 1,419,540 | Brown | June 13, 1922 |
| 2,533,523 | Sivey et al. | Dec. 12, 1950 |
| 2,544,265 | Kelly et al. | Mar. 6, 1951 |
| 2,576,795 | Lane | Nov. 27, 1951 |
| 2,750,702 | Hartig | June 19, 1956 |
| 2,788,606 | Boggs | Apr. 16, 1957 |

FOREIGN PATENTS

| 605,667 | Canada | Sept. 27, 1960 |